United States Patent
Oshiro

(10) Patent No.: US 7,340,369 B2
(45) Date of Patent: Mar. 4, 2008

(54) DETECTION DEVICE FOR DECREASED TIRE PRESSURES AND METHOD THEREOF

(75) Inventor: Yuji Oshiro, Kobe (JP)

(73) Assignee: Sumitomo Rubber Industries, Ltd., Kobe-shi (JP)

(*) Notice: Subject to any disclaimer, the term of this patent is extended or adjusted under 35 U.S.C. 154(b) by 14 days.

(21) Appl. No.: 11/225,101

(22) Filed: Sep. 14, 2005

(65) Prior Publication Data
US 2006/0076095 A1   Apr. 13, 2006

(30) Foreign Application Priority Data
Sep. 24, 2004   (JP) .............................. 2004-277584

(51) Int. Cl.
*G06F 15/00* (2006.01)
(52) U.S. Cl. .................... 702/148; 702/145; 702/189
(58) Field of Classification Search ................ 702/148, 702/145, 189, 33; 152/209.16, 209.15, 209.24; 116/342; 73/146, 8, 146.3; 701/29, 69; 340/442, 444, 445; 296/37.2
See application file for complete search history.

(56) References Cited

U.S. PATENT DOCUMENTS

| | | | | |
|---|---|---|---|---|
| 5,111,687 A | * | 5/1992 | Hill | .............................. 73/146 |
| 5,323,870 A | * | 6/1994 | Parigger et al. | ............. 180/197 |
| 5,591,906 A | * | 1/1997 | Okawa et al. | ............. 73/146.5 |
| 5,940,781 A | * | 8/1999 | Nakajima | ..................... 702/98 |
| 6,100,798 A | * | 8/2000 | Liang | ......................... 340/447 |
| 6,763,288 B2 | * | 7/2004 | Caretta et al. | ................. 701/1 |
| 6,774,776 B2 | * | 8/2004 | Yanase | ........................ 340/444 |
| 6,976,391 B2 | * | 12/2005 | Maquaire | ..................... 73/146 |
| 7,053,761 B2 | * | 5/2006 | Schofield et al. | ........... 340/447 |

(Continued)

FOREIGN PATENT DOCUMENTS

EP    0 783 983 A1    7/1997

(Continued)

OTHER PUBLICATIONS

Butz et al., 'Parallel Parameter Estimation in Full Motor Vehicle Dynamics', Jan. 2000, SIAM Publication, vol. 33, No. 4, pp. 1-5.*

(Continued)

*Primary Examiner*—Carol S. W. Tsai
*Assistant Examiner*—Elias Desta
(74) *Attorney, Agent, or Firm*—Birch, Stewart, Kolasch & Birch, LLP

(57) ABSTRACT

A device, and an analogous method and program, for detecting whether different tires are mounted on the left and right driving wheels of a vehicle and accurately detecting decreased tire pressures. The device detects the rotational speeds of wheels mounted on the vehicle, detects torque applied to driving wheels, and calculates the inclinations of straight lines representing (1) the relation between the rotational speed ratio of the front and rear left side wheels and torque applied to driving wheels and (2) the relation between the rotational speed ratio of the front and rear left side wheels and torque applied to driving wheels. The device compares the inclinations of the lines to detect whether different tires are mounted on the driving wheels. Based on the comparison of the inclinations, the device changes the threshold for judging tire deflation to different values for different tires and tires that are not different.

6 Claims, 4 Drawing Sheets

DIFFERENT KIND OF TIRE

U.S. PATENT DOCUMENTS 7,057,526 B2 * 6/2006 Yanase .................. 340/870.16

FOREIGN PATENT DOCUMENTS

| EP | 0 970 823 A2 | 1/2000 |
|---|---|---|
| EP | 1 332 895 A1 | 8/2003 |
| EP | 1 352 765 A2 | 10/2003 |
| JP | 63-305011 A | 12/1988 |
| JP | 9-188114 A | 7/1997 |
| JP | 11-78442 A | 3/1999 |
| JP | 2000-79812 A | 3/2000 |
| JP | 2002-19435 A | 1/2002 |
| JP | 2002-181669 A | 6/2002 |
| JP | 2002-211220 A | 7/2002 |

OTHER PUBLICATIONS

Buznikov, 'Software for the INKA Tire-Pressure Monitoring System', Jul. 2004, PPC Publication, vol. 37, No. 7, pp. 798-803.*

* cited by examiner

DETECTION DEVICE FOR DECREASED TIRE PRESSURES AND METHOD THEREOF

BACKGROUND OF THE INVENTION

The present invention relates to a device for detecting decreased pressures of tires mounted on a vehicle and a method thereof. More specifically, the present invention relates to a device and a method for accurately detecting the decreased tire pressures by detecting that the kind of tires mounted on a vehicle differs.

When the pressures of tires mounted on a vehicle are decreased, a fuel mileage is deteriorated and there is danger of provoking burst at high speed running. When the tire pressures are reduced, decreased pressure is detected, utilizing the change of properties of tires such as the decrease of the dynamic load radii of tires and the change of resonance frequency.

For example, a conventional detection device for the decreased tire pressures uses a principle that since the outer diameter of a tire (the dynamic load radius of a tire) is reduced more than that of a tire having normal inner pressure when the pressure of a specified tire of a vehicle is reduced, rotational angular velocity is increased as compared with other normal tires. For example, a method for detecting the decrease of inner pressure from the relative difference of the rotational angular velocities of tires uses the value obtained from following formula as a judging value;

$$DEL=\{(F1+F4)/2-(F2+F3)/2\}/\{(F1+F2+F3+F4)/4\}\times 100(\%)$$

(Japanese Unexamined Patent Publication No. 305011/1988). Wherein F1 to F4 are the rotational angular velocities of a front left tire, a front right tire, a rear left tire and a rear right tire, respectively.

However, when the kind of tires mounted differs, the decreased tire pressures cannot be accurately detected.

Accordingly, a method for distinguishing the abrasion of a tire and the kind of tires has been proposed.

The invention described in Japanese Unexamined Patent Publication No. 188114/1997 discloses a method for distinguishing the kind of tires mounted on a vehicle, for example, whether the tire is a tire for summer or a tire for winter, by comparing the inclination of a straight line which is obtained by plotting a ratio of the rotational speed of a front wheel to that of a rear wheel against the speed of a vehicle, with the data of a tire whose kind is known by preliminary measurement.

The invention described in Japanese Unexamined Patent Publication No. 78442/1999 uses relation between a ratio of the rotational speed of a front wheel to that of a rear wheel and the acceleration of a vehicle in order to detect the abrasion state of tire.

The invention described in Japanese Unexamined Patent Publication No. 79812/2000 discloses a method for distinguishing whether the tire mounted on a driving axle is a tire for summer or a tire for winter by utilizing the reciprocal number of a turning radius using the judging value of tire deflation (DEL), but the method is limited to a vehicle mounted with LSD (Limited Slip Differential).

The invention described in Japanese Unexamined Patent Publication No. 19435/2002 and Japanese Unexamined Patent Publication No. 181669/2002 uses relation between a slip ratio (a value obtained by dividing the difference between the rotational speed of following wheels and the rotational speed of driving wheels by the rotational speed of driving wheels) and the acceleration of a vehicle, in order to distinguish the kind of tires.

Japanese Unexamined Patent Publication No. 211220/2002 discloses a method for distinguishing the kind of tires in accordance with the size of unevenness of the judging value of tire deflation (the average of the absolute value of the judging value of tire deflation).

The ratios of the rotational speeds of the front and rear wheels of respective left and right wheels are not proportional to the speed of a vehicle. For example, the ratio of the rotational speeds of the front and rear wheels is larger at a rising gradient road surface than that at a flat road even if its speed is slow. Further, acceleration is small at the rising gradient road surface but driving force is large; therefore the ratio of the rotational speeds of the front and rear wheels is larger than that at a flat road and the ratio of the rotational speeds of the front and rear wheels is not proportional to the speed of a vehicle. Consequently, it cannot be distinguished that the kind of left and right tires is different even though relation between the ratios of the rotational speeds of the front and rear wheels of respective left and right wheels and the speed or acceleration of a vehicle is examined.

When the kind of tires differs depending on positions of a vehicle, in particular, the kinds of tires respectively mounted on the left and right driving wheels differ, the tire deflation cannot be accurately judged by the threshold for judging tire deflation in the case of loading the same kind of tires. Further, when the kinds of tires respectively mounted on the left and right driving wheels differ, driving properties differ at left and right; therefore there are problems such as the distance of breakage becomes longer, because slip is generated and braking operation does not work well. Consequently, it is required that it is alarmed to a driver that the kinds of tires respectively mounted on the left and right driving wheels differ, and the vehicle control system (such as ABS and TRC) is actuated in accordance with the different kind of tires.

SUMMARY OF THE INVENTION

Although the abrasion tires and whether tires mounted at time are tires for summer or tires for winter can be distinguished, it has not conventionally been able to distinguish that the kind of tires differs when the different kinds of tires are respectively mounted on the left and right driving wheels.

It is the purpose of the present invention to provide a device for accurately detecting whether the different kinds of tires are respectively mounted on the left and right driving wheels, without being limited to such as the situation of a road surface and the composition of a vehicle in which LSD is mounted.

Further, it is the purpose of the present invention to provide a device for accurately detecting the decreased tire pressures even if the different kinds of tires are respectively mounted on the left and right driving wheels.

The detection device of heterogeneous tires of the present invention is a device for detecting whether the kind of tires differs or not based on the rotational speeds of wheels mounted on a vehicle, and is characterized in that the device is equipped with a calculation means for calculating the inclination of each of relational straight lines from relation between a ratio of the rotational speed of a front wheel to that of a rear wheel in the left side wheels of the vehicle and torque applied to driving wheels and relation between a ratio of the rotational speed of a front wheel to that of a rear wheel in the right side wheels of the vehicle and the torque applied to driving wheels, and detects that heterogeneous tires are mounted on the driving wheels by comparing the inclination of the relation of the left side wheels with the inclination of the relation of the right side wheels.

In the present invention, the rotational speed of a wheel is a product of the rotational angular velocity of a wheel with the radius of a given tire.

In the present invention, for example, the following is carried out in order to detect that the different kinds of tires are mounted on the respective left and right driving wheels.

When the following formulae are represented from the relation between a ratio of the rotational speed of a front wheel to that of a rear wheel in the right side wheels of the vehicle and the torque applied to driving wheels; Rotational speed of left front wheel/rotational speed of left rear wheel Rotational speed of left front wheel/rotational speed of left rear wheel =

$a1 \times$ torque to driving wheel $+ b1$

Rotational speed of right front wheel/rotational speed of right rear wheel = $a2 \times$ torque to driving wheel $+ b2$, it is judged that heterogeneous tires are mounted on the driving wheels, when either of the relational formulae is satisfied for a predetermined C or k.

i) $|a1-a2|>c$
ii) $a1/a2>k$ or
iii) $a2/a1>k$

Further, the fore-mentioned predetermined C or k is set as;

$c=|a1-a2|/M$ $k=1+(a1/a2-1)/N$ (provided that $a1>a2$)

from $|a1-a2|$ and $a1/a2$ ($a1>a2$) or $a2/a1$ ($a2>a1$), after the fore-mentioned relations;

Rotational speed of left front wheel/rotational speed of left rear wheel =

$a1 \times$ torque to driving wheel $+ b1$

Rotational speed of right front wheel/rotational speed of right rear wheel = $a2 \times$ torque to driving wheel $+ b2$, are determined by changing the kind of tires (for example, tires for summer or tires for winter) by every vehicle brand.

For example, the denominator M or N of the fore-mentioned formulae for determining c or k is 2, but the values of M and N can be selected by vehicle brands and the kind of tires (for example, tires for summer or tires for winter).

Further, the detection device of the decreased tire pressures of the present invention is a device for detecting the decreased tire pressures mounted on a vehicle based on the rotational speeds of wheels mounted on a vehicle and is characterized in that the device is equipped with a means for detecting the rotational speeds of wheels, a means for detecting torque applied to driving wheels, a calculation means for calculating the primary coefficients of straight lines which approximate primarily respective relations from relation between a ratio of the rotational speed of a front wheel to that of a rear wheel in the left side wheels of the vehicle and torque applied to driving wheels and relation between a ratio of the rotational speed of a front wheel to that of a rear wheel in the right side wheels of the vehicle and the torque applied to driving wheels, and a detection means for heterogeneous tires which judges that heterogeneous tires are respectively mounted on the left and right driving wheels by comparing the primary coefficient of the relation of the left side wheels with the primary coefficient of the relation of the right side wheels, and a threshold for judging the decreased tire pressures is changed to a threshold in a case of loading heterogeneous tires when it is judged that the heterogeneous tires are respectively mounted on the left and right driving wheels.

A conventional art has judged whether all tires are worn or not and whether tires mounted are tires for summer or tires for winter, but the present invention judges whether tires respectively mounted on the left and right driving wheels are different kinds or not.

According to the detection device of heterogeneous tires of the present invention, it can be alarmed to a driver that heterogeneous tires are mounted on the respective left and right driving wheels and persuade the driver to exchange tires. Further, according to the detection device of the decreased tire pressures of the present invention, even if heterogeneous tires are mounted on the respective left and right driving wheels, the tire deflation can be accurately detected by setting to the judgment threshold of the tire deflation in the case of loading heterogeneous tires. Thereby, even if heterogeneous tires are mounted on the respective left and right driving wheels, it can be accurately alarmed to a driver that the tire deflation occurs. Referring to Example described later, when the difference between drive torque—the inclination of the rotational speed ratio property of front and rear wheels at a right side and drive torque—the inclination of the rotational speed ratio property of front and rear wheels at a left side exceeds $0.2 \times 10^{-5}$ in a FR vehicle (Mercedes-Benz, E-class), it can be judged that heterogeneous tires are mounted on the respective left and right driving wheels. Further, in the same Example, a deflation rate at which the decreased tire pressures is judged is 30%, the judgment threshold of deflation in case that the same tires are mounted on the respective left and right driving wheels is set as 0.1 and the judgment threshold of deflation in case that heterogeneous tires are mounted on the respective left and right driving wheels is set as 0.13. Thereby, in a state in which one wheel is deflated by 10%, deflation is not judged for either of a case that the same tires are mounted on the respective left and right driving wheels and a case that heterogeneous tires are mounted on the respective left and right driving wheels, in a FR vehicle (Mercedes-Benz, E-class). In a state in which one wheel is deflated by 30%, deflation can be judged for either of a case that the same tires are mounted on the respective left and right driving wheels and a case that heterogeneous tires are mounted on the respective left and right driving wheels.

According to the present invention, it can be accurately judged that heterogeneous tires are mounted, therefore when heterogeneous tires are mounted, optimum control in accordance with different kinds of tires on the respective left and right driving wheels can be carried out using the information for such as an ABS (antilock brake system) system, a TRC (traction control system) system.

For example, in the ABS system, it is inputted from the detection device of heterogeneous tires of the present invention that the kinds of tires on the respective left and right driving wheels are different, and the distribution of the brake operating power of respective wheels can be set in accordance with the kinds of tires. In the ABS system, slipping (tire locking) is momentarily detected and brake operating power is adjusted in real time, but the maximum brake power just before respective wheels are locked can be obtained by setting the brake operating power for every wheel in accordance with the kinds of tires; therefore safer and more reliable breakage can be realized. As a result, even though the kinds of tires on the respective left and right driving wheels are different, a car body is not inclined toward heading direction under breakage and a driver can operate a brake in state in which direction control is possible.

In the TRC system, it is inputted from the detection device of heterogeneous tires of the present invention that the kinds of tires on the respective left and right driving wheels are different, and the more effective drive control of a vehicle can be realized, for example, by adjusting the drive power distribution of left and right wheels and setting the upper limit of drive power in accordance with the kinds of tires to suppressing slip at start and acceleration.

According to the detection device of heterogeneous tires of the present invention, it can be accurately detected that heterogeneous tires are mounted on the respective left and right driving wheels irrespective of the state of a road surface and without loading LSD on a vehicle.

Further, according to the detection device of the decreased tire pressures of the present invention, even if heterogeneous tires are mounted, the tire deflation can be accurately detected by setting to the judgment threshold of deflation in the case of loading heterogeneous tires.

DETAILED DESCRIPTION

The detection device of heterogeneous tires of the present invention determines the inclinations of straight lines which were obtained by primarily approximating relation between a ratio of the rotational speed of a front wheel to that of a rear wheel and torque to driving wheels, for respective left and right wheels, compares the fore-mentioned inclinations of straight lines of the left and right wheels, and judges that heterogeneous tires are mounted on driving wheels when the difference of the inclinations is a fixed threshold or more. Further, it can be judged which of the left and right driving wheels slips easily, from the size of the inclination. Further, the kinds of left and right tires can be judged by comparing the fore-mentioned inclinations of straight lines which were obtained by primary approximation during running, with the relation (the inclinations of straight lines primarily approximated) between the rotational speed ratio of the front and rear wheels and torque to driving wheels which was preliminarily measured by every kind of tires.

Since friction between road surface and tires-slip property (μ–s property) differs, a slip rate (the rotational speed ratio of the front and rear wheels) is changed. Since the slip rate is proportional to driving force (torque) and following wheels do not slip, the rotational speed of the following wheels/the rotational speed of the driving wheels can be set as the slip rate (of reciprocal value). Then, it can be accurately detected that heterogeneous tires are mounted on the respective left and right driving wheels, by comparing the driving force to the slip rate property which was determined from the relation between the rotational speed ratio of the respective front and rear wheels and the driving force.

Further, when it is detected that heterogeneous tires are mounted on the respective left and right driving wheels, it can be prevented that the tire deflation is erroneously alarmed nevertheless the tire pressures are not reduced, by changing the threshold for judging deflation to a value corresponding to the loading of heterogeneous tires.

The detection device of heterogeneous tires of the present invention is not limited to a vehicle with 4 wheels when the driving wheels are 2 wheels at left and right and the rotational speed ratio of the following wheels/the rotational speed of the left driving wheel and the rotational speed of the following wheels/the rotational speed of the right driving wheel are set against the following wheels at the same axle, and can be applied also to a vehicle with 3 wheels and a vehicle with 6 wheels.

EMBODIMENT

Figure 1:
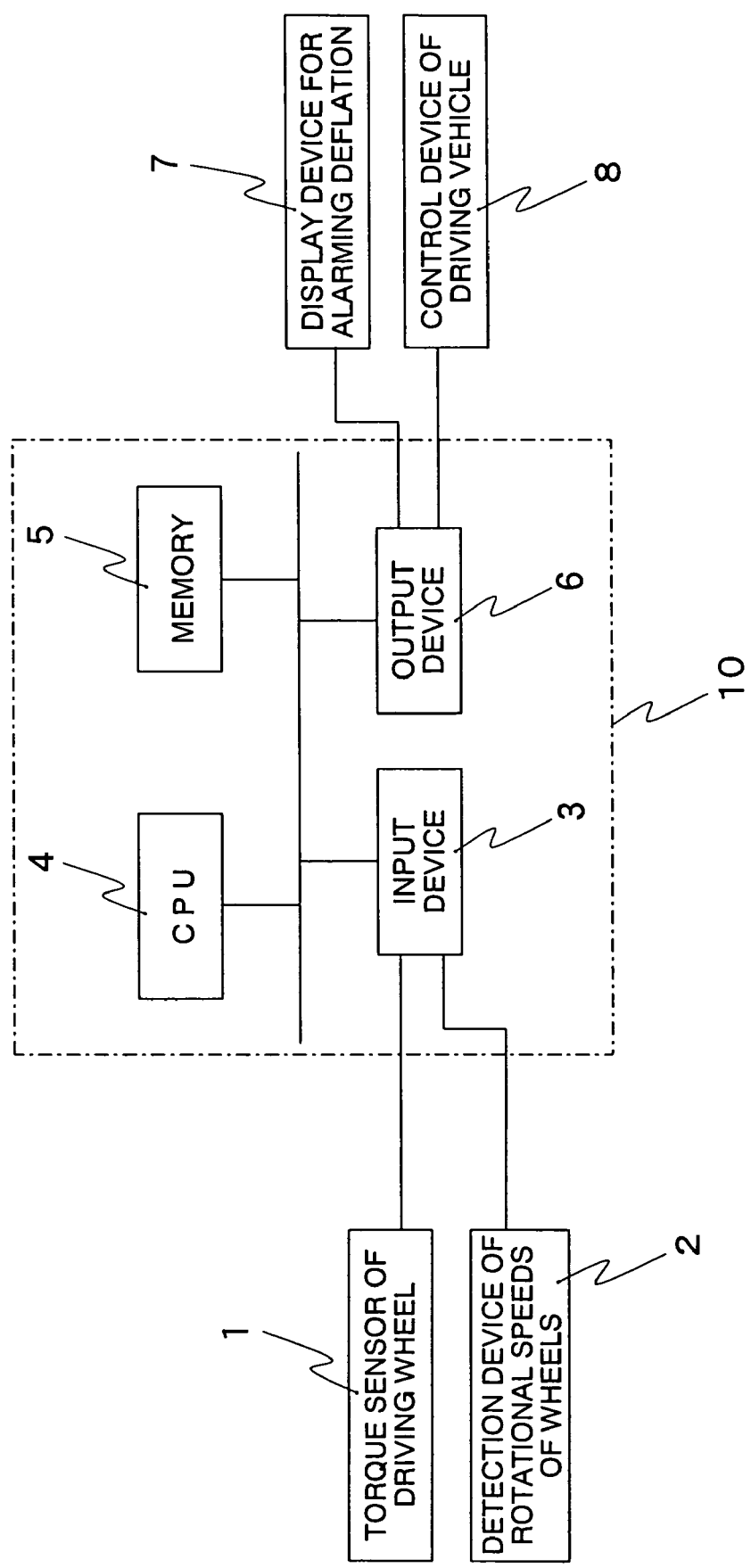
FIG. 1 is a block diagram of one example of the detection device of the decreased tire pressures related to the Embodiment of the present invention.

FIG. 1 is a block diagram of the detection device of the decreased tire pressures related to the Embodiment of the present invention. The detection device 10 of the decreased tire pressures inputs the driving torque of a vehicle from the torque sensor 1 of driving wheels through an input sensor 3 and memorizes it in a memory 5. Further, the information of the rotational speeds of wheels from a detection device 2 of the rotational speeds of wheels is inputted to be memorized in the memory 5. The information of the rotational speeds of wheels from a detection device 2 of the rotational speeds of wheels may be pulses which are generated by the speeds of wheels. In that case, the rotational speeds of wheels can be calculated from the cycle of pulses inputted or the number of pulses at a time interval. CPU 4 performs the detection program of heterogeneous tires and the detection program of the decreased tire pressures of the present invention stored in the memory 5. In the present Embodiment, one memory 5 is described, but the program may be divided to be memorized in ROM (read-only memory) and calculation data may be divided to be memorized in RAM (random access memory). Further, a display device 7 for alarming deflation which displays the deflation alarm of the tire pressures being judged and a control device 8 of driving a vehicle utilizing the information of loading heterogeneous tires and the information of the decreased tire pressures are connected thereto.

The driving axle of the vehicle is equipped with a differential gear, and since driving torque differs at the left and right driving wheels, torque sensors are provided at the respective left and right driving wheels, but unless heterogeneous tires are detected during the vehicle is cornering, the torque sensor may be provided at one spot of a propeller shaft. A strain gauge of measuring the strain of a driving axle can be used as the torque sensor.

Figure 2:
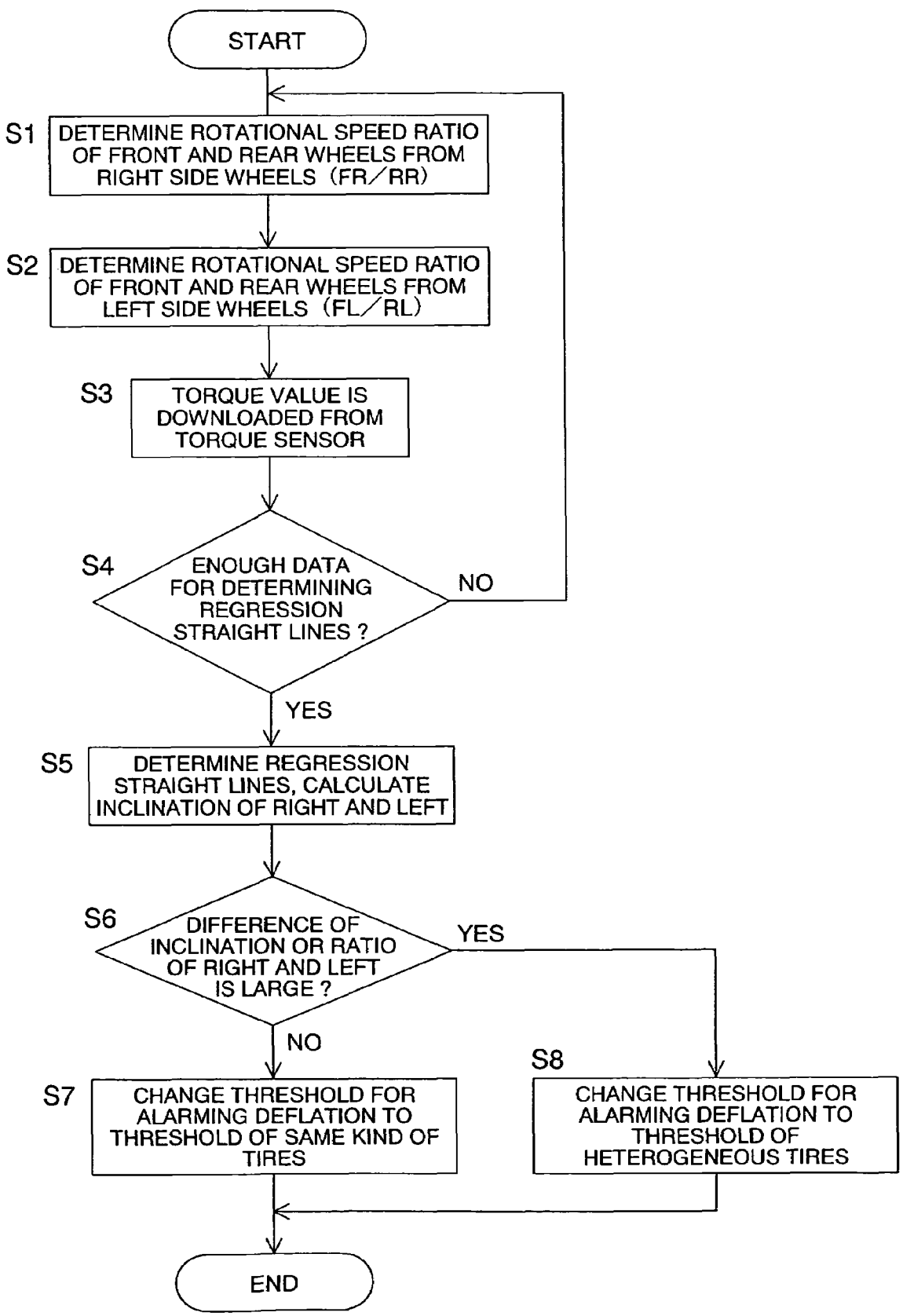
FIG. 2 is a flow chart showing an example of the detection method of heterogeneous tires related to the Embodiment of the present invention.

FIG. 2 is a flow chart showing an example of the detection method of heterogeneous tires of the present invention. Referring to FIG. 2, a method for detecting whether heterogeneous tires are mounted on driving wheels is illustrated.

The rotational speeds of wheels mounted on a vehicle is inputted from the detection device 2 of the rotational speeds of wheels to determine the rotational speed ratio of the front and rear wheels of right side wheels (Step S1) and the rotational speed ratio of the front and rear wheels of left wheels (Step S2). Then, the torque of driving wheels is inputted from the torque sensor 1 of driving wheels (Step S3). In fact, the rotational speeds of wheels and the torque of driving wheels are simultaneously inputted.

Steps S1 to S3 are repeated until data enough for being capable of primarily approximating (regression straight lines are determined) the relation between the torque of driving wheels and the rotational speed ratios of the front and rear wheels of respective left and right wheels are collected (Step S4). Hereat, "capable of primarily approximating" means that the standard deviation of a primary coefficient is adequately lessened in comparison with the difference of inclinations of the detecting heterogeneous tires described later (for example, the standard deviation of a primary coefficient is less than $\frac{1}{10}$ of the threshold of the difference of inclinations). When the data of required number of samples are collected, the regression straight line of the relation between the torque of driving wheels and the rotational speed ratio of the front and rear wheels of left side wheels and the regression straight line of the relation between the torque of driving wheels and the rotational speed ratio of the front and rear wheels of right side wheels are determined, and their respective inclinations are calculated (Step S5).

After comparing the inclination of the regression straight line of left side wheels with the inclination of the regression straight line of right side wheels, the difference is compared with a predetermined value. Unless the difference of inclinations of the regression straight lines of left and right wheels exceeds the predetermined value, it is judged that the kinds of tires of the respective left and right driving wheels are the same, and the threshold for judging tire deflation is set as a threshold in the case of the same kind of tires (Step S7). When the difference of inclinations of the regression straight lines of left and right wheels is the predetermined value or more, it is judged that the kinds of tires at the respective left and right driving wheels are different, and the threshold for judging tire deflation is set as a threshold in the case of heterogeneous tires (Step S8).

The predetermined value c for judging the difference of inclinations of the regression straight lines of left and right wheels, or the predetermined value k for judging the ratio of inclinations is set as;

$c=|a1-a2|/M$ $k=1+(a1/a2-1)/N$ (provided that a1>a2) or $k=1+(a2/a1-1)/N$ (provided that a2>a1)

from $|a1-a2|$ and $a1/a2$ (when $a1>a2$) or $a2/a1$ (when $a2>a1$), after the fore-mentioned relations;

Rotational speed of left front wheel/rotational speed of left rear wheel =

$a1 \times$ torque to driving wheel $+ b1$

Rotational speed of right front wheel/rotational speed of right rear wheel $= a2 \times$ torque to driving wheel $+ b2$, are determined by changing the kind of tires (for example, tires for summer or tires for winter) for every vehicle brand.

The denominator M or N of the fore-mentioned formulae for determining c or k can be set as 2, for example, but the values of M and N can be selected by vehicle brands and the kind of tires (for example, tires for summer or tires for winter).

The threshold for judging tire deflation in case that the kinds of tires on the respective left and right driving wheels are different is preliminarily measured to be determined. It is preferable that the threshold for judging tire deflation is set by every combination of tires with different kinds of tires which can be mounted on the vehicle. Since the threshold for judging tire deflation is considered to be symmetric, the same threshold is used even if different kinds of tires are reverse at left and right. Namely, when the kinds of tires to be employed for a vehicle brand are 3, there are 3 thresholds, and when the kinds of tires are 4, there are 6 thresholds.

Further, it can be judged which of the left and right driving wheels tends to slip, from the steepness of inclinations of the regression straight lines of left and right wheels. In the present Embodiment, since the rotational speed ratio of the following wheels/the rotational speed of the driving wheels is referred to as the rotational speed ratio of the front and rear wheels, the inclination of the regression straight lines is negative, and a tire having small inclination (the absolute value of the inclination is large) tends to slip. Further, the kinds of left and right tires can be judged by comparing the fore-mentioned inclinations of the regression straight lines during running which were primarily approximated, with the relation (the inclinations of the straight lines primarily approximated) between the rotational speed ratios of the front and rear wheels and the torque of driving wheels which were preliminarily measured by every kind of tires (for example, tires for summer or tires for winter).

Although not described in the flow chart of FIG. 2, it is judged whether the tire is deflated by exceeding the deflation rate which was set by the threshold, by comparing the threshold for judging tire deflation which was set at Step S7 or Step S8, with the threshold for judging tire deflation during running.

EXAMPLE

Then, an example in which the relation between the fore-mentioned torque of driving wheels and the rotational speed ratio of the front and rear wheels was compared at left and right wheels in a real vehicle, for a case that the kinds of tires on the respective left and right driving wheels are the same and a case that the kinds of tires on the respective left and right driving wheels are different.

An FR vehicle (Mercedes-Benz, E-class) was used for experiment, and the experiment was carried out by running on a general road under conditions of 2 persons boarding, normal tire pressures and a tire size of 205/60R16, for a case that the respective left and right driving wheels are the same kind and a case that the respective left and right driving wheels are different kinds.

Figure 3:
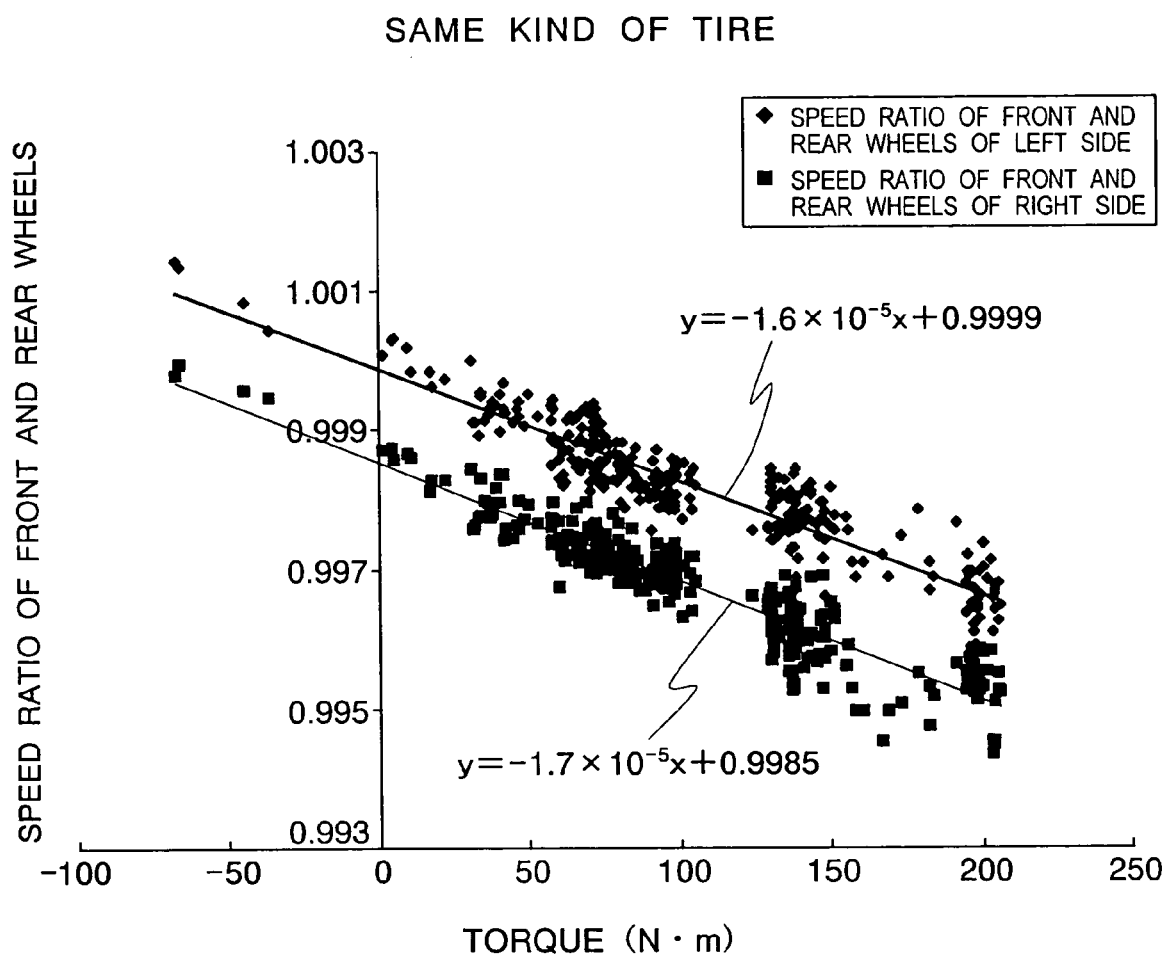
FIG. 3 is a graph in which the rotational speeds of the front wheels/the rotational speeds of the rear wheels at respective left and right are plotted against driving torque in one example when the same kind of tires at the respective left and right driving wheels are mounted, related to the Embodiment of the present invention.

FIG. 3 is a graph in which the rotational speeds of the front wheels/the rotational speeds of the rear wheels of respective left and right are plotted relative to driving torque when the same kind of tires at the respective left and right driving wheels are mounted.

Figure 4:
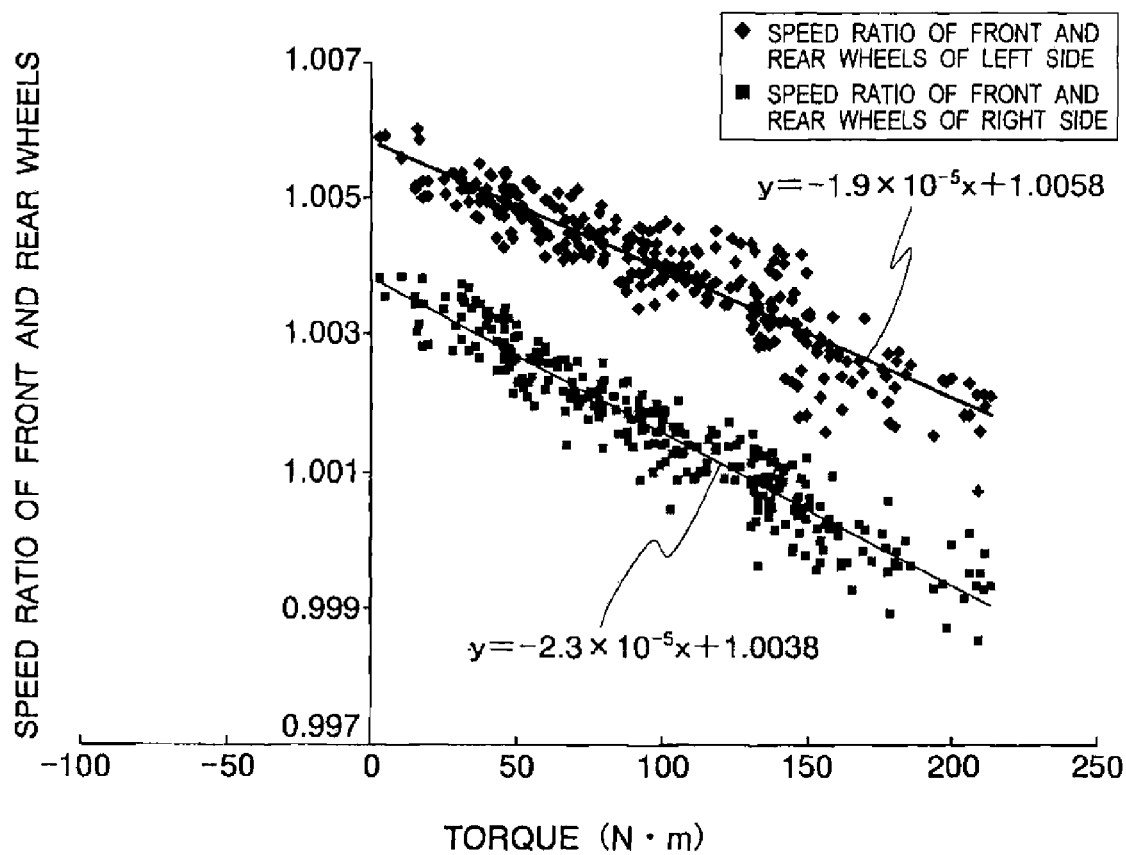
FIG. 4 is a graph in which the rotational speeds of the front wheels/the rotational speeds of the rear wheels of respective left and right sides are plotted against driving torque in one example when heterogeneous tires at the respective left and right driving wheels are mounted, related to the Embodiment of the present invention.

FIG. 4 is a graph in which the rotational speeds of the front wheels/the rotational speeds of the rear wheels of respective left and right are plotted relative to driving torque when heterogeneous tires at the respective left and right driving wheels are mounted.

The inclination of driving torque—the rotational speed ratio of front and rear wheels at the left side wheels was $-1.6 \times 10^{-5}$ and the inclination of driving torque—the rotational speed ratio of front and rear wheels at the right side wheels was $-1.7 \times 10^{-5}$, in the case of the same kind of tires of FIG. 3.

The inclination of driving torque—the rotational speed ratio of front and rear wheels at the left side wheels was $-1.9 \times 10^{-5}$ and the inclination of driving torque—the rotational speed ratio of front and rear wheels at the right side wheels was $-2.3 \times 10^{-5}$, in the case of the heterogeneous tires of FIG. 4.

The difference of inclinations in the case of the same kind of tires of FIG. 3 was $0.1 \times 10^{-5}$ and the difference of inclinations in the case of heterogeneous tires of FIG. 4 was $0.4 \times 10^{-5}$; therefore the difference of inclinations of the property of driving torque—the rotational speed ratios of front and rear wheels at left and right is larger for the heterogeneous tires. Then, when the difference of inclinations of the property of driving torque—the rotational speed ratios of front and rear wheels at left and right exceeds $0.2 \times 10^{-5}$, it can be judged that heterogeneous tires are mounted at the respective left and right driving wheels. Alternatively, when the ratio of inclinations of the property of driving torque—the rotational speed ratios of front and rear wheels at left and right exceeds, for example, 1.1 times (or less than 0.9 times), it can be judged that heterogeneous tires are mounted on the respective left and right driving wheels.

The threshold of the difference of inclinations for judging whether the fore-mentioned heterogeneous tires are mounted or not is different by every type of vehicles. The properties of the rotational speeds of front and rear wheels are preliminarily measured by every type of vehicles and the threshold for judging the mounted heterogeneous tires is set.

Further, since the inclination of the property of driving torque—the rotational speed ratios of front and rear wheels at right side is smaller under the condition of FIG. 4 (the absolute value is larger), it can be judged that the wheel at right side tends to slip.

In the case of the present Example, when the deflation rate for judging the decreased tire pressure is 30% and the same kind of tires are mounted at the respective left and right driving wheels, the threshold for judging tire deflation by real measurement is 0.1 and when the heterogeneous tires are mounted at the respective left and right driving wheels, the threshold for judging tire deflation by real measurement is 0.13. These thresholds are preliminarily memorized in the alarming device of the tire pressures and an experiment of judging deflation was carried out by applying the method shown in the flow chart of FIG. 2.

In the present Example, a value obtained by the following formula is used as the judging value of the decreased tire pressures;

$$((((W_{FL}+W_{RR})/2)-((W_{FR}+W_{RL})/2))/(W_{FL}+W_{FR}+W_{RL}+W_{RR})/4) \times 100$$

Wherein $W_{}$ represents the rotational speed of a wheel, and  represents the position of the wheel (FL: front left, FR: front right, RL: rear left and RR: rear right).

Under the setting, when test running was carried out at deflation of 10% for one wheel, thresholds in accordance with the same kind of tires and the heterogeneous tires at the respective left and right driving wheels are selected by the detection of heterogeneous tires, and no alarm was given for either of a case of the same kind of tires and a case of the heterogeneous tires.

Under the same setting, when test running was carried out at deflation of 30% for one wheel, thresholds in accordance with the same kind of tires and the heterogeneous tires at the respective left and right driving wheels are selected by the detection of heterogeneous tires, and alarm was given for either of a case of the same kind of tires and a case of the heterogeneous tires.

Thus, when the heterogeneous tires are mounted at the respective left and right driving wheels, an alarm that the heterogeneous tires are mounted is given to a driver to promote replacing tires. Referring to the fore-mentioned Example, when the difference between the inclination of the property of driving torque and the rotational speed ratios of front and rear wheels at right side and the inclination of the property of driving torque and the rotational speed ratios of front and rear wheels at left side exceeds $0.2 \times 10^{-5}$ in an FR vehicle (Mercedes-Benz, E-class), it is judged that the heterogeneous tires are mounted at the respective left and right driving wheels and it can be alarmed to a driver that the heterogeneous tires are mounted.

Further, the detection of the decreased tire pressures can be accurately carried out under the same deflation condition even if the kind of tire is different, by setting the judgment thresholds of deflation in accordance with the same or different kind of tire at the respective left and right driving wheels. Referring to the fore-mentioned Example, no deflation was judged for either of a case that the same kind of tires was mounted at the respective left and right driving wheels and a case that the heterogeneous tires were mounted, in a state in which one wheel was deflated by 10% in the FR vehicle (Mercedes-Benz, E-class). Deflation could be judged for either of a case that the same kind of tires was mounted at the respective left and right driving wheels and a case that the heterogeneous tires were mounted, in a state in which one wheel was deflated by 30%. Consequently, the danger of tire deflation can be notified to a driver without fail under the same deflation condition even if the kind of tire is different, by setting the judgment thresholds of deflation in accordance with the same or different tire classification at the respective left and right driving wheels, utilizing the result of the detection device of heterogeneous tires of the present invention. The tire deflation cannot be judged in all types of vehicles at the same deflation rate in case that the heterogeneous tires are mounted, but according to the present invention, when the heterogeneous tires were mounted and the tire pressures were not reduced to a level for alarming, the alarm of tire deflation is not falsely given at all.

In the present Example, an FR vehicle was used, however the detection method of heterogeneous tires and the detection method of the decreased tire pressures of the present invention are not limited to the FR vehicle, but can be also similarly applied to an FF vehicle, an RR vehicle, an MR vehicle and a 4 WD vehicle.

In the present invention, a case that the heterogeneous tires are mounted was illustrated, but when the degree of abrasion differs at the respective left and right driving wheels, it can be detected that the degree of abrasion differs at the respective left and right driving wheels, by comparing the inclination of the property of driving torque and the rotational speed ratios of front and rear wheels at left and right side of the present invention (a case that the degree of abrasion differs is recognized as the heterogeneous tires).

What is claimed is:

1. A detection device for detecting whether the kind of tires mounted on different wheels of a vehicle differs, the device comprising:

means for detecting the rotational speeds of wheels mounted on the vehicle;

means for detecting torque applied to driving wheels of the vehicle;

means for calculating the inclination of a first straight line representing the relation between (1) a ratio of the rotational speed of a left front wheel to that of a left rear wheel of the vehicle and (2) torque applied to driving wheels of the vehicle;

means for calculating the inclination of a second straight line representing the relation between (1) a ratio of the rotational speed of a right front wheel to that of a right rear wheel of the vehicle and (2) the torque applied to driving wheels;

means for comparing the inclination of the first straight line with the inclination of the second straight line;

means for comparing a difference or a ratio between the inclinations of the first and second straight lines with predetermined values for a difference or a ratio between the inclinations;

means for determining from the difference or the ratio between the inclinations whether different tires are mounted on left and right sides of the vehicle; and means for providing an indication of whether different tires are mounted on left and right sides of the vehicle.

2. A detection method for detecting whether the kind of tires mounted on different wheels of a vehicle differs, the method comprising the steps of:

(a) detecting the rotational speeds of wheels mounted on the vehicle;

(b) detecting torque applied to driving wheels of the vehicle;

(c) calculating the inclination of a first straight line representing the relation between (1) a ratio of the rotational speed of a left front wheel to that of a left rear wheel of the vehicle and (2) torque applied to driving wheels of the vehicle;

(d) calculating the inclination of a second straight line representing the relation between (1) a ratio of the rotational speed of a right front wheel to that of a right rear wheel of the vehicle and (2) the torque applied to driving wheels;

(e) comparing the inclination of the first straight line with the inclination of the second straight line;

(f) comparing a difference or a ratio between the inclinations of the first and second straight lines with predetermined values for a difference or a ratio between the inclinations;

(g) determining from step (f) whether different tires are mounted on left and right sides of the vehicle; and (h) providing an indication of the results of step (g).

3. A detection program provided in a device for detecting whether the kind of tires mounted on different wheels of a vehicle differs, the program, when executed, carrying out a method comprising the steps of:

(a) detecting the rotational speeds of wheels mounted on the vehicle;

(b) detecting torque applied to driving wheels of the vehicle;

(c) calculating the inclination of a first straight line representing the relation between (1) a ratio of the rotational speed of a left front wheel to that of a left rear wheel of the vehicle and (2) torque applied to driving wheels of the vehicle;

(d) calculating the inclination of a second straight line representing the relation between (1) a ratio of the rotational speed of a right front wheel to that of a right rear wheel of the vehicle and (2) the torque applied to driving wheels;

(e) comparing the inclination of the first straight line with the inclination of the second straight line;

(f) comparing a difference or a ratio between the inclinations of the first and second straight lines with predetermined values for a difference or a ratio between the inclinations;

(g) determining from step (f) whether different tires are mounted on left and right sides of the vehicle; and (h) providing an indication of the results of step (g).

4. A detection device for detecting decreased tire pressure in tires mounted on wheels of a vehicle, the device comprising:

means for detecting the rotational speeds of wheels mounted on the vehicle;

means for detecting torque applied to driving wheels of the vehicle;

means for calculating the inclination of a first straight line representing the relation between (1) a ratio of the rotational speed of a left front wheel to that of a left rear wheel of the vehicle and (2) torque applied to driving wheels of the vehicle;

means for calculating the inclination of a second straight line representing the relation between (1) a ratio of the rotational speed of a right front wheel to that of a right rear wheel of the vehicle and (2) the torque applied to driving wheels;

means for comparing the inclination of the first straight line with the inclination of the second straight line;

means for comparing a difference or a ratio between the inclinations of the first and second straight lines with predetermined values for a difference or a ratio between the inclinations;

means for determining from the difference or the ratio between the inclinations whether different tires are mounted on left and right sides of the vehicle;

means for making a determination of reduced tire pressure from differences in rotational speeds of wheels mounted on the vehicle;

means for comparing the determination of reduced tire pressure with (1) a first threshold value when different tires are determined to be mounted on the left and right sides of the vehicle and (2) a second threshold value when different tires are not determined to be mounted on the left and right sides of the vehicle; and means for providing an indication of reduced tire pressure based on the comparison of the determination of reduced tire pressure with the threshold values.

5. A detection method for detecting decreased tire pressure in tires mounted on wheels of a vehicle, the method comprising the steps of:

(a) detecting the rotational speeds of wheels mounted on the vehicle;

(b) detecting torque applied to driving wheels of the vehicle;

(c) calculating the inclination of a first straight line representing the relation between (1) a ratio of the rotational speed of a left front wheel to that of a left rear wheel of the vehicle and (2) torque applied to driving wheels of the vehicle;

(d) calculating the inclination of a second straight line representing the relation between (1) a ratio of the rotational speed of a right front wheel to that of a right rear wheel of the vehicle and (2) the torque applied to driving wheels;

(e) comparing the inclination of the first straight line with the inclination of the second straight line;

(f) comparing a difference or a ratio between the inclinations of the first and second straight lines with predetermined values for a difference or a ratio between the inclinations;

(g) determining from step (f) whether different tires are mounted on left and right sides of the vehicle;

(h) making a determination of reduced tire pressure from differences in rotational speeds of wheels mounted on the vehicle;

(i) determining reduced tire pressure by comparing the determination of reduced tire pressure with (1) a first threshold value when different tires are determined to be mounted on the left and right sides of the vehicle and (2) a second threshold value when different tires are not determined to be mounted on the left and right sides of the vehicle; and (j) providing an indication of the results of step (i).

6. A detection program provided in a device for detecting decreased tire pressure in tires mounted on wheels of a vehicle, the program, when executed, carrying out a method comprising the steps of:

(a) detecting the rotational speeds of wheels mounted on the vehicle;

(b) detecting torque applied to driving wheels of the vehicle;

(c) calculating the inclination of a first straight line representing the relation between (1) a ratio of the rotational speed of a left front wheel to that of a left rear wheel of the vehicle and (2) torque applied to driving wheels of the vehicle;

(d) calculating the inclination of a second straight line representing the relation between (1) a ratio of the rotational speed of a right front wheel to that of a right rear wheel of the vehicle and (2) the torque applied to driving wheels;

(e) comparing the inclination of the first straight line with the inclination of the second straight line;

(f) comparing a difference or a ratio between the inclinations of the first and second straight lines with predetermined values for a difference or a ratio between the inclinations;

(g) determining from step (f) whether different tires are mounted on left and right sides of the vehicle; and (h) making a determination of reduced tire pressure from differences in rotational speeds of wheels mounted on the vehicle;

(i) determining reduced tire pressure by comparing the determination of reduced tire pressure with (1) a first threshold value when different tires are determined to be mounted on the left and right sides of the vehicle and (2) a second threshold value when different tires are not determined to be mounted on the left and right sides of the vehicle; and (j) providing an indication of the results of step (i).

* * * * *